Dec. 5, 1961 — C. S. LONGSTREET — 3,011,310
FUEL SUPPLY SYSTEM
Filed March 12, 1957 — 3 Sheets-Sheet 1

INVENTOR.
CHARLES S. LONGSTREET
BY Cecil F. Arenz
ATTORNEY

Dec. 5, 1961 C. S. LONGSTREET 3,011,310
FUEL SUPPLY SYSTEM
Filed March 12, 1957 3 Sheets-Sheet 3

INVENTOR.
CHARLES S. LONGSTREET
BY Cecil J Arens

ATTORNEY

United States Patent Office 3,011,310
Patented Dec. 5, 1961

3,011,310
FUEL SUPPLY SYSTEM
Charles S. Longstreet, South Bend, Ind., assignor to The Bendix Corporation, a corporation of Delaware
Filed Mar. 12, 1957, Ser. No. 645,513
10 Claims. (Cl. 60—39.28)

This invention relates to fuel control systems for internal combustion engines and more particularly to a fuel control system for metering fuel to a gas turbine engine of the "twin-spool" type in such a manner as to avoid a region of compressor stall.

For some time the manufacturers of gas turbine engines and fuel controls therefor have been plagued with a severe limitation on acceleration caused by compressor instability or stall. Various types of controls have been devised most of which contemplate, in one way or another, scheduling the flow of fuel to the engines in such a manner as to avoid the region of compressor instability. Another approach to the problem has been to build engines of a type having two compressors which rotate independently of each other. These two compressor engines are known in the art as "twin-spool" engines. It is a prime purpose of this type of engine to improve the stall characteristics of the composite compressor. This purpose is accomplished if the ratio of the speeds of the separate compressors do not vary beyond acceptable limits. For any given twin-spool engine having a fixed nozzle area, there is a fixed schedule of speed ratios with respect to the speed of either compressor for steady state operation. This schedule is referred to as the steady state ratio. Some variance from the steady state ratio is unavoidable during periods of acceleration. For this reason it has been determined that the well known fuel metering functions which have been used in controlling fuel to single-spool engines may be inadequate and that any control function for twin-spool engines must take into consideration the speed ratio factor of the two compressors if fuel scheduling during acceleration is not to be unduly restricted.

It is also desirable to accomplish this end without using temperature sensing devices, which in the past have proved to be unreliable due to slow response and ultimate deterioration from the very high temperatures to which they may be exposed. It is therefore an object of the present invention to provide a fuel control which will enable the twin-spool engine with which it is associated to accelerate as rapidly as possible despite appreciable variations from the steady state ratio.

It is another object of this invention to provide a fuel control for twin-spool gas turbine engines which meters fuel to the engine according to the function $$W_f = KNP_D f_1\left(\frac{P_D}{P_i}\right) f_2\left(\frac{N_1}{N_2}\right)$$

to avoid compressor instability.

It is a further object of this invention to provide a fuel control which meters fuel to the engine according to a predetermined function such that a maximum acceleration of the engine will be attained without encountering compressor stall regardless of variations in the speed ratio of the compressor.

It is an object of this invention to provide a fuel control for twin-spool gas turbine engines in which the rotational speeds of the compressors are sensed and utilized to control fuel flow to avoid regions of compressor instability regardless of variations in speed ratio of the compressors.

It is another object of this invention to provide a fuel control for twin-spool engines which meters fuel to the engine during acceleration of the engine in accordance with the relationship $$W_f = KNP_D f_1\left(\frac{P_D}{P_i}\right) f_2\left(\frac{N_1}{N_2}\right)$$

to avoid the compressor stall area.

Figure 3:
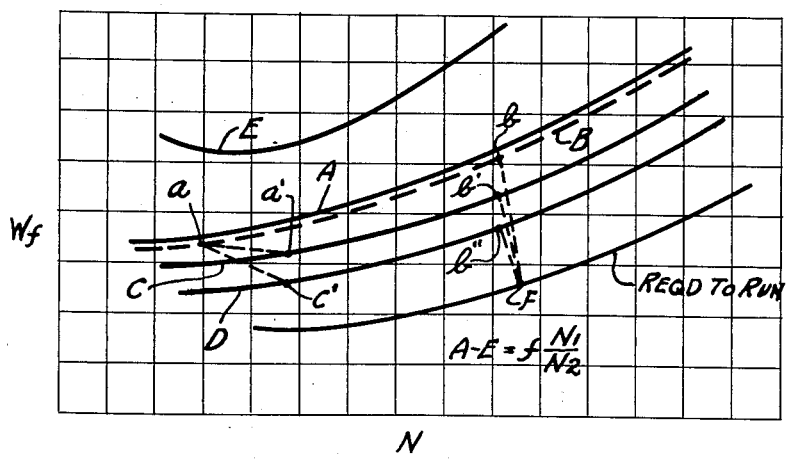
Figure 4:
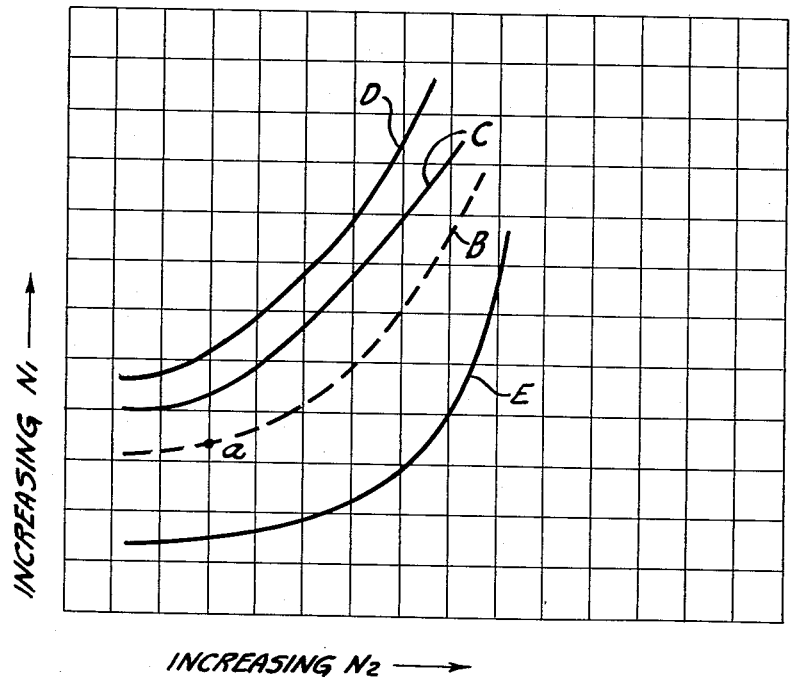

FIGURE 3 is a graph of $W_f$ vs. $N$ plotted in relation to a third variable $N_1/N_2$ and which illustrates the manner in which the present invention controls fuel flow to avoid compressor stall conditions during speed ratio variations; and FIGURE 4 is a graph having an $N_1$ vs. $N_2$ relationship which illustrates the relationship of $N_1$ to $N_2$ over a speed range in which compressor stall is critical for lead and lag speed ratio conditions at any given $N_2$.

Referring now to FIGURE 3, a series of curves are shown wherein the weight rate of fuel ($W_f$) is plotted against rotational speed ($N$) of one of the compressors in terms of the speed ratio $N_1/N_2$ of the low pressure and high pressure compressors.

Although certain other variables enter into the equation upon which the weight rate of fuel ($W_f$) supplied to the engine is based, these variables can be considered as having a given set of values for the purpose of this discussion such that the weight rate of fuel ($W_f$) varies as a function of the speed $N$ and speed ratio $N_1/N_2$ only as represented by the curves of FIGURE 3. Line A represents the actual engine fuel flow at the point where the composite compressor can be said to be entering stall conditions for various speed ratio values. Line B represents the fuel metered to the engine for the equivalent condition and, as shown, follows line A very closely such that a maximum acceleration ratio will be permitted without exceeding the stall limit.

Lines C and D represent the fuel limits where the low pressure compressor encounters stall at speed ratios $$\left(\frac{N_1}{N_2}\right)$$

of five percent and ten percent, respectively, above the steady state speed ratios (lead). Curve E represents the fuel required to cause the low pressure compressor to encounter stall under a condition of decreasing speed ratio $$\left(\frac{N_1}{N_2}\right)(\text{lag})$$

It is obvious that a condition of lag in speed ratio does not represent the serious limiting factor on permissible fuel flow as would be the case in a lead condition. The present invention is arranged to control fuel flow to the engine according to line B which indicates a schedule slightly below curve A, for common compressor stall and for all low pressure compressor speeds less than those corresponding to the speed ratios on the common stall curve. A metering function, $$W_f = KNP_D f_1\left(\frac{P_D}{P_i}\right) f_2\left(\frac{N_1}{N_2}\right)$$

has been arrived at which closely follows the common stall curve A. The parameters in the above mentioned equation are as follows:

$W_f$ = Weight of fuel delivered to the engine
$N$ = Speed of either compressor
$P_1$ = Low pressure compressor inlet pressure $P_D$=High pressure compressor discharge pressure
$N_1$=Low pressure compressor speed
$N_2$=High pressure compressor speed
$K$=Constant of proportionality The $$W_f = KNP_D f_1\left(\frac{P_D}{P_i}\right)$$

relationship is a basic speed pressure relationship according to which fuel is scheduled during an acceleration with $$f_2\left(\frac{N_1}{N_2}\right)$$

being designed to correct for variations in the speed ratio of the low and high pressure compressors.

In FIGURE 3, line B is defined by the relation $$f_2\left(\frac{N_1}{N_2}\right)$$

and it is along this line that fuel flow is metered for any condition below steady state (lag) and, in no case, will fuel be supplied in excess of this schedule. Where the speed ratio $N_1/N_2$ is above steady state, as in the case of curves C and D, a factor must be introduced to limit fuel flow along the curves.

Figure 1:
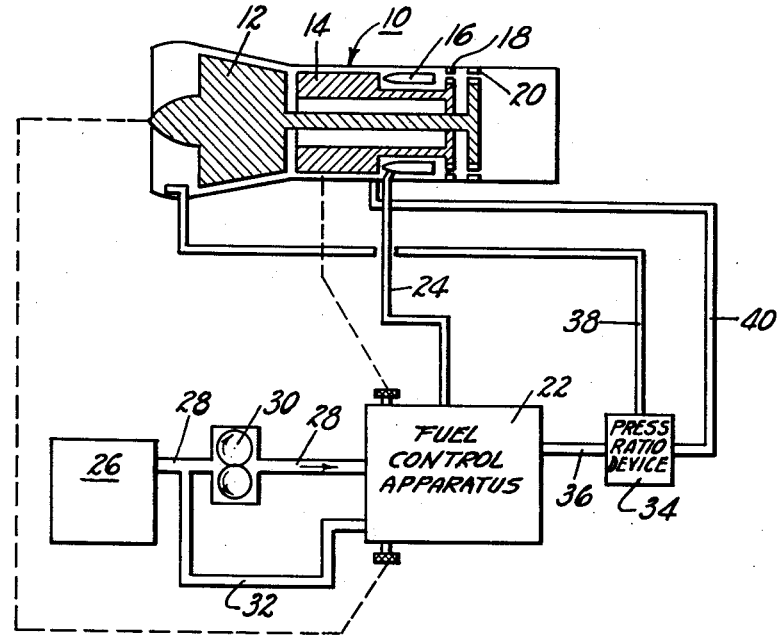
FIGURE 1 is a schematic representation of a twin-spool gas turbine engine and the fuel system of the invention associated therewith.

Referring now to FIGURE 1, numeral 10 represents a twin-spool axial flow gas turbine engine having a low pressure compressor 12, a high pressure compressor 14, burners 16, a high pressure turbine 18, and a low pressure turbine 20. Fuel is delivered to the burners 16 through the action of a fuel metering unit shown generally at 22 which communicates with nozzles in the burners via a discharge pipe 24. The fuel metering unit 22 receives pressurized fuel from a source 26 through a conduit 28 which contains a pump 30. A by-pass conduit 32 returns fuel in excess of engine fuel requirements to the pump 30 inlet. A compressor pressure ratio computing device 34 is connected with the fuel metering unit via a conduit 36 and with the low pressure compressor inlet and high pressure compressor discharge via conduits 38 and 40, respectively.

Figure 2:
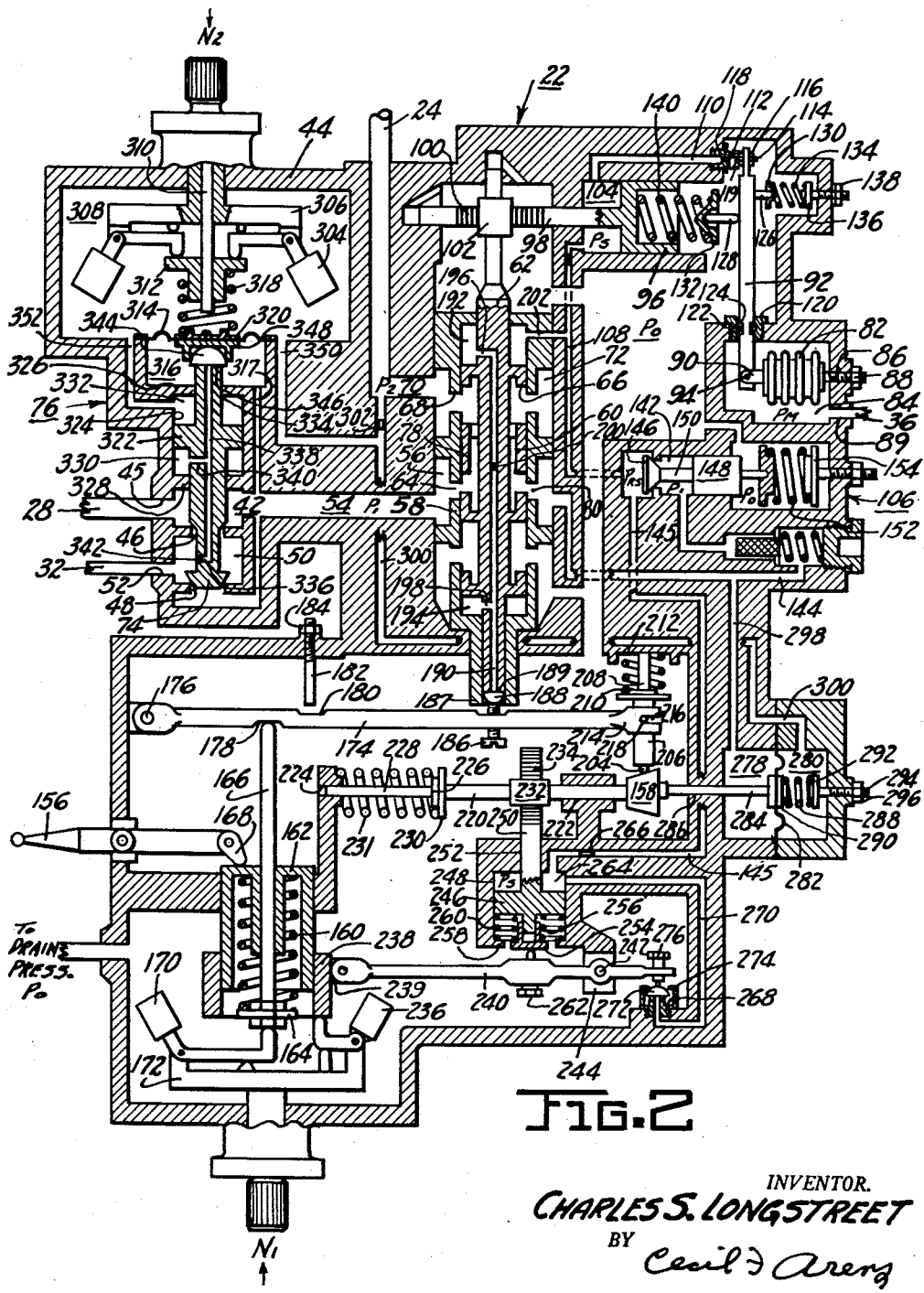
FIGURE 2 is a sectional schematic of the present invention shown removed from the engine and drawn in enlarged form.

FIGURE 2 is a sectional view of the fuel metering unit 22. A chamber 42 formed in a casing 44 receives fuel from conduit 28 through an inlet port 45. Fuel flows out of chamber via two paths, one of which conducts excess fuel back to the pump inlet by way of by-pass ports 46 and 48, chamber 50, outlet port 52 and conduit 32. The other path conducts fuel to the burners by way of a passage 54, an inlet annulus 56, formed between the casing 44 and a fixed cylindrical sleeve member 58, a chamber 60, formed by an axially and rotatably actuable cylindrical metering valve 62 and connected to annulus 56 by main metering ports 64, valve and sleeve outlet ports 66 and 68, a conduit 70 connected to said ports by an outlet annulus 72, the discharge conduit 24 and the burner nozzles. The by-pass ports 46 and 48 are controlled by a double landed poppet valve 74 which is controlled to vary the pressure differential across metering port 64 by a speed-head regulator unit 76.

Square port 78 formed in the wall of metering valve 62 is adapted to variably register with an associated square port 80 formed in the wall of fixed sleeve member 58 to vary the effective area of the main metering port 64 which connects the inlet annulus 56 to the valve chamber 60. The metering port 64 is either square or rectangular in shape and the area thereof is determined by dimensions "A" and "B"; dimension "B" is varied whenever the rotational position of the metering valve changes; and dimension "A" is varied whenever the axial position of the valve changes.

The rotational position of metering valve 62 and the "B" dimension of metering port 64 are controlled by an evacuated bellows 82 which is mounted in a chamber 84 and secured in position by an extension 86 threadedly engaged with casing 44. A nut 88 engages extension 86 to lock the bellows at any desired position. The chamber 84 is connected to the discharge side of the high pressure compressor via a passage 89, conduit 36, the compressor pressure ratio computer device 34 and conduit 40. The compressor pressure ratio computer device acts to control the compressor discharge pressure $P_M$ within chamber 84 as a function of the pressure ratio across the composite compressor and forms no part of the present invention. For a detailed description of the compressor pressure ratio device 34 reference is made to copending application Serial No. 574,691 filed March 29, 1956, in the name of Haase et al. (common assignee). A variation in compressor discharge pressure $P_D$ results in a variation in the pressure $P_M$ in chamber 84 and a movement or a change in length of bellows 82 which movement is a function of the compressor pressure ratio $$\left(\frac{P_D}{P_i}\right)$$

across the composite compressor. The change in length effects a corresponding change in the rotational position of valve 62 through link 90 pivotally attached to a lever 92 by a pin 94, a cylindrical cup-shaped piston 96 slidably mounted in casing 44 and provided with an extension 98 upon which is formed a rack 100 engageably connected to a pinion 102 secured on metering valve 62. The piston 96 is responsive to the pressure $P_s$ in a variable volume chamber 104. The chamber receives fuel from a servo pressure regulating unit 106 through a passage 108 and discharges fuel through a passage 110 to pump inlet pressure $P_0$. The servo pressure $P_s$ in variable volume chamber 104 is controlled by a half-ball valve member 112 which coacts with a valve seat member 118 threadedly engaged with casing 44 at the discharge end of passage 110. The position of the half-ball 112 relative to the valve seat 118 is established by an actuating pin 114 removably secured to a flattened end of lever 92 and adjustably secured to the lever by means of a lock nut 116. The half-ball 112 is held in place by a retaining member 119 removably secured to valve seat member 118. The lever 92 extends through and is pivotally mounted in a fitting 120 which is secured in an opening in the wall of chamber 84. An O ring 122 is secured in a recess 124 in lever 92 to provide a fluid seal. Rods 126 and 128 are fixedly secured to lever 92 and extend in opposite directions at right angles to the lever to engage spring retainers 130 and 132 respectively. A spring 134 is interposed between spring retainer 130 and a spring retainer 136 adjustably secured in position by means of an extension threadedly engaged with casing 44 and locked in place by a nut 138. A spring 140 is interposed between piston 96 and spring retainer 132.

The servo pressure regulator unit 106, of conventional design, is provided to maintain a constant supply of fuel at a predetermined pressure $P_{RS}$ to the pressure $P_s$ actuated piston 96 and to other servo mechanism which is to be described. A bore 142 receives fuel at $P_1$ pressure from inlet annulus 56 via a passage 144 and discharges fuel at regulated pressure $P_{RS}$ to passages 108 and 145. A valve 146 coacts with an associated valve seat to control the flow of fuel through the bore 142. A piston 148 is secured to valve 146 via an extension 150 and is reciprocably mounted in bore 142 with opposing sides subjected to $P_1$ pressure and pump inlet pressure $P_0$. The desired servo pressure $P_{RS}$ is established by means of a spring 152, the force of which is applied against piston 148 in opposition to the pressure $P_1$. The spring 152 may be adjusted to suit requirements by means of an adjustable spring retainer 154 threadedly engaged with casing 44.

The axial position of metering valve 62 and the "A" dimension of metering port 64 is controlled by an engine all-speed governor control and the position of a pilot controlled lever 156 and a contoured three dimensional cam 158 axially and rotatably actuable in response to the speeds of the low pressure and high pressure compressor speeds, respectively. The governor control is provided with a governor spring 160 interposed between a cylindrical cup-shaped member 162 slidably contained by casing 44 and a thrust bearing 164 securely fixed at the end of a stem 166 which extends axially through cup-shaped member 162 and is slidably engaged therewith. The governor spring 160 may be selectively set by the pilot through suitable linkage including lever 156 and cam member 168. When lever 156 is turned clockwise, the governor spring 160 is compressed and acts to reset a pair of governor weights 170, only one of which is visible, mounted to rotate with a carrier 172 having a driving connection with the low pressure compressor 12. When the selected speed is reached, the governor weight force will balance the governor spring force and an equilibrium condition is attained, whereupon the engine will operate at a substantially constant speed for the particular setting of the pilot's control lever 156.

A lever 174 pivotally connected to casing 44 by a pin 176 is provided with a notch 178 which is engaged by stem 166 and a notch 180 which engages an adjustable minimum fuel flow stop 182 threadedly engaged with casing 44 and locked in position by a nut 184. An adjustable screw member 186 threadedly engaged with lever 174 is arranged to engage a half-ball valve member 188 carried in a bored opening in a reduced diameter portion of sleeve member 58. The half-ball valve 188 is prevented from dropping out of the bored opening by means of an inwardly extending flange 187 formed at the end of sleeve member 58. The half-ball valve member 188 is adapted to coact with a valve seat 189 formed on the end of a reduced diameter portion of metering valve 62 to control the flow of fuel from a passage 190 axially disposed through the metering valve. Variable volume chambers 192 and 194 are disposed within sleeve member 58 at opposite ends of metering valve 62 and communicate with passage 190 through radial passages 196 and 198, respectively. A restriction 200 is disposed in passage 190 between radial passages 196 and 198. The variable volume chamber 192 receives fuel from passage 108 via a branch passage 202.

The cam 158 is automatically positioned rotatably as a function of low pressure compressor speed and axially as a function of high pressure compressor speed to limit the maximum open position of metering port 64 during acceleration of the engine. A follower member 204 is fixedly secured to a flanged tubular member 206 slidably engaged with a guide rod 208 fixedly secured to casing 44. A spring 210 interposed between the tubular member and a recessed portion 212 of casing 44 urges the follower member 204 into contact with cam 158. The end of lever 174 is provided with bifurcations 214, only one of which is visible, having slots 216 which are engaged by oppositely disposed pins 218 fixedly secured to tubular member 206.

The cam 158 is carried by a supporting rod 220 rotatably and axially journalled in openings 222 and 224 in casing 44. A shoulder 226 formed by a reduced diameter portion 228 of supporting rod 220 is arranged to engage a spring retainer 230. A spring 231 interposed between casing 44 and spring retainer 230 serves to bias the rod 220 toward the right. A pinion 232 securely attached to the supporting rod 220 is adapted to be rotated by a rack 234; the rack being actuated as a function of the thrust force exerted by a pair of weights 236 in response to the speed of the low pressure compressor 12.

The weights 236, only one of which is shown, are mounted to rotate with the carrier 172 along with the governor weights 170. The weights 236, however, act independently of the weights 170. Thus, while the weights 170 act against the thrust bearing 164, the weights 236 act on a sliding sleeve 238 concentrically arranged with the cylindrical cup-shaped member 162, said sleeve in turn having a driving connection with a lever 240, the later being fulcrumed on a pin 242 secured to a projection 244 of casing 44. A piston 246 slidably engaged in a chamber 248 is provided with an extension 250 which extends through an opening 252 in casing 44 and is slidably engaged therewith. The rack 234 is formed on the free end of extension 250. A projection centrally located on piston 246 and extending outwardly therefrom is arranged to slidably receive cup-shaped spring retaining member 254. A spring 256 interposed between piston 246 and the spring retaining member 254 acts to urge the spring retaining member away from piston 246. An inwardly extending shoulder 258 formed on casing 44 is arranged to engage one end of a spring 260, the other end of the spring being engaged with piston 246 to urge the piston in an upward direction. An adjustable pin 262 threadedly engaged with lever 240 and being engageable with the spring retaining member 254 acts to transmit the thrust force of the weights 236 from lever 240 to piston 246 through spring 256. A variable volume chamber 264 is partially defined by the upper surface of piston 246 and receives fuel at servo pressure $P_S$ through the passage 145. A restriction 266 is secured in passage 145 to control the variable volume 264 pressure level sensitivity. A valve seat fitting 268 removably secured in casing 44 at the discharge end of a passage 270 connected to variable volume chamber 264 coacts with a half-ball valve member 272 to vary the flow of fuel between variable volume chamber 264 and fuel at drain pressure $P_0$. The half-ball valve member is held in position adjacent the valve seat by a retaining member 274 secured to the fitting 268. An adjustable pin 276 threadedly engaged with the free end of lever 240 is operatively engaged with the half-ball 272.

The cam 158 is positioned axially as a function of the pressure differential across the metering valve 62, which differential is varied as a function of the high pressure compressor speed by the speed-head regulator unit 76 which is to be described. Variable volume chambers 278 and 280 are oppositely disposed to a diaphragm 282 which is secured at its outer edge to casing 44. A stem 284 is securely attached to the central portion of diaphragm 282 and is slidably mounted in an opening 286 in casing 44. A spring 288 is interposed between a spring retainer 290 securely attached to the center portion of diaphragm 282 and an adjustable spring retainer 292 having an extension 294 threadedly engaged with casing 44 and locked in position by a nut 296. The variable volume chambers 278 and 280 communicate with metering valve 62 inlet and outlet fuel pressures through passages 298 and 300, respectively, passage 300 having a restriction 302 secured therein.

The speed head regulator unit 76 is provided with a pair of weights 304 mounted to rotate on a carrier 306 having a driving connection with the high pressure compressor 14. The carrier 306 and the weights 304 are arranged to rotate within a chamber 308. A cylindrical stem 310 secured to carrier 306 extends axially therefrom and slidably carries a thrust bearing 312 which moves axially in response to the force output of the weights 304. A diaphragm 314 is secured at its outer edge (through any suitable means) to casing 44 and is responsive to the fluid pressure differential between chamber 308 on one side and a chamber 316 on the opposite side. The chamber 316 is supplied fuel at inlet pressure $P_1$ through a passage 317 connected between the chamber and passage 54. A spring 318 interposed between the thrust bearing 312 and a spring retainer 320 securely attached to the center section of diaphragm 314 acts to preload the diaphragm. The by-pass valve 74 is provided with an enlarged diameter portion 322 slidably arranged in a bore 324 having laterally extending partitions 326 and 328. The enlarged diameter portion 322 together with the laterally extending partitions form variable volume chambers 330 and 332. The by-pass valve 74 is slidably received in openings 334 formed in the partitions 326 and 328. The by-pass valve 74 is provided with radial and axial passages 336 and 338, repsectively, which communicate chamber 50 with chamber 316. The variable volume chamber 332 communicates with the axial passage 338 via a second radial passage 340. A restriction 342 is removably secured in the radial passage 336. A half-ball valve member 344 is arranged to coact with a valve seat 346 formed on the by-pass valve at the end of the axial passage 338. A retaining member 348 is securely attached (through any suitable means such as the screw shown) to the center portion of diaphragm 314 and acts to hold the half-ball 344 adjacent the valve seat 346. A passage 350 connected between chamber 308 and passage 300 conducts fuel at outlet pressure $P_2$ to chamber 308 from which it flows to variable volume chamber 332 via passage 352.

Operation

To illustrate the operation of the device, it will be assumed that acceleration of the engine from point $a$ to point $b$ on the curve of FIGURE 3 has been initiated by a clockwise rotation of lever 156.

For the purposes of the following discussion, the N scale of FIGURE 3 is to be considered in terms of $N_2$ to conform to the series of curves of FIGURE 4 in which $N_1$ is shown as the variable according to a selected $N_2$ speed.

The spring 160 is compressed causing a downward movement of stem 166 and a resetting of the governor weights 170 such that the lever 174 is caused to rotate in a clockwise direction until the follower member 204 engages the surface of cam 158. The half-ball valve member 188 is caused to move away from valve seat 189 thus decreasing the pressure in variable volume chamber 194 which in turn causes metering valve 62 to move downward in an opening direction. As the engine begins to accelerate in response to the increase in fuel flow through metering port 64, the high pressure compressor weights 304 respond and act through spring 318 against diaphragm 314 to urge half-ball 344 toward valve seat 346 which action reduces flow from chamber 316 to passage 338 and causes a drop in pressure in chamber 330. The by-pass valve 74 responds to the change in pressure differential across the enlarged diameter portion 322 and moves downward toward a closed position thus causing a decrease in the quantity of fuel by-passed through ports 46 and 48. A subsequent rise in inlet pressure $P_1$ occurs in passage 54 which in turn is transmitted through passage 317 to chamber 316 causing a corresponding increase in the $P_1-P_2$ pressure differential across diaphragm 314 until a balance of forces exist against diaphragm 314 under which condition the half-ball 344 position is stabilized and the by-pass valve 74 is maintained in a corresponding position. Since the same $P_1-P_2$ pressure differential exists across both metering valve 62 and diaphragm 314, the by-pass valve will operate to vary the pressure differential across the metering valve in proportion to the speed of the high pressure compressor. The diaphragm 282 responds to the increased pressure differential occurring across the metering valve 62 and moves to the right against the force of spring 288 to position cam 158 axially, the contour of the cam being such that follower member 204 is caused to move in a downward direction. The speed of the low pressure compressor tends to increase as the high pressure compressor speed increases and the subsequent increase in output force of weights 236 is transmitted via lever 240 to half-ball 272 which in turn moves towards valve seat 268 thus causing an increase in pressure in variable volume chamber 264 and a corresponding downward movement of piston 246 until a balance is attained between the force of spring 256 and the opposing force of the pressure $P_S$ acting against piston 246 whereupon cam 158 assumes a new position rotationally. The maximum "A" dimension of metering valve 62 is thus controlled according to the contour of cam 158, which contour may be varied to provide any desired function of the speed ratio $N_1/N_2$ depending upon the particular characteristics of the engine involved. As the engine accelerates, the rotational position of metering valve 62 and thus the "B" dimension is varied in accordance with modulated compressor discharge pressure $P_M$ which increases as a function of the pressure ratio $P_D/P_1$ of the composite compressor. Thus, in accordance with the increase in modulated pressure $P_M$, the bellows 82 contracts and rotates lever 92 counterclockwise which in turn causes an actuation of half-ball valve member 112 toward valve seat 118 and a subsequent rise in pressure $P_S$ in chamber 104. The piston 96 responds to the increase in pressure $P_S$ and causes the metering valve 62 to rotate clockwise, looking from the upper end of the valve, which in turn causes an increase in the "B" dimension of metering port 64 and a corresponding increase in fuel flow to the engine. As the piston 96 moves the lever 92 is rotated clockwise in response to the force of spring 140 until a balance of forces on the lever is reached whereupon the half-ball valve member is held stationary and the pressure $P_S$ in chamber 104 is maintained at a corresponding value. The engine will accelerate along line B as fuel flow to the engine increases. If the speed ratio $N_1/N_2$ should increase (indicating a leading condition) the low pressure compressor would encounter stall conditions at a somewhat lower rate of fuel flow than it would if the speed ratio $N_1/N_2$ was maintained at the aforementioned predetermined schedule. In such a case, the weights 236 would respond to cause a further increase in pressure in variable volume chamber 264, which in turn causes a counterclockwise rotation of the cam 158 when viewed from the pinion end. The follower member 204 following the contour of the cam 158, rises to move the flanged tubular member 206 upward to effect a counterclockwise rotation of the lever 174, which in turn displaces the half-ball 188 toward valve seat 189 thus causing a reduction in the pressure differential between variable volume chambers 192 and 194. The metering valve 62 in response to the decreased pressure differential moves upward to reduce the "A" dimension and the effective flow area of metering port 64 which in turn causes a reduction in fuel flow to the engine. As the fuel flow is reduced, the engine accelerates along a line from $a$ to $a'$, point $a'$ being a point of intersection with line C after which the engine accelerates along line C to point $b'$ thus skirting the lowered region of stall. Under a condition of ten percent lead, the engine would accelerate along a line from $a$ to intersect line D at point $c'$ after which point the engine would accelerate along line D to point $b''$. At point $b$, $b'$ or $b''$, the governor weights 170 function to control the position of metering valve 62 by overriding the action of cam 158. The governing action results in counterclockwise rotation of lever 174 which lifts follower member 204 from the cam 158 surface and actuates half-ball valve 188 toward valve seat 189. The fuel pressure in variable volume chamber 194 is caused to increase which in turn effects movement of metering valve 62 in a closing direction to govern the engine to point F on the required to run curve. At point F, the engine speed will be stabilized in accordance with the selected speed.

If the speed ratio $N_1/N_2$ should decrease (indicating a lagging condition) as a result of a low pressure compressor speed deviation, the variable volume chamber pressure 264 will be controlled according to the weight 236 force to position cam 158 rotationally as heretofore described. Since the $N_1$ or low pressure compressor speed is below that required to maintain the correct $N_1/N_2$ speed ratio, the weight 236 force output signal will be less accordingly and cam 180 will be rotated to a corresponding lesser degree for a given increment of axial displacement of the cam. The cam contour is designed such that the follower member 204 and thus the position of metering valve 62 will continue to be actuated in accordance with the steady state ratio function. The fuel flow to the engine will be scheduled along line B which represents the maximum allowable fuel flow schedule.

Although only one embodiment of the invention has been illustrated various changes or arrangements may be made without departing from the spirit of the invention. It will be understood that control of the governor portion of the device is not limited to $N_1$ operation but may be controlled by $N_2$ instead and the $P_1-P_2$ pressure differential may be controlled in response to $N_1$ rather than $N_2$. In such a case, the cam 158 will be controlled axially as a function of $N_1$ and rotatably as a function of $N_2$ with the contour of the cam being designed accordingly to vary the acceleration schedule as desired according to engine characteristics.

I claim:

1. In a fuel system for a gas turbine engine having a burner, a low pressure compressor, a high pressure compressor, a conduit for supplying fuel to the burner, valve means in the conduit for varying the flow to the burner, first means responsive to the speed of one of said compressors for controlling a fuel pressure differential across said valve means, second means responsive to the speed of the other of said compressors, third means responsive to the pressure differential across said valve means, and fourth means operatively connecting said valve means with said second and third means, for controlling the position of said valve means as a function of the ratio between said low and high pressure compressor speeds, said fourth means being actuable as a function of the ratio of said low and high pressure compressor speeds to vary the maximum flow position of said valve means to avoid compressor instability during an acceleration of the engine.

2. The combination with a gas turbine engine equipped with two independently driven air compressors, of a fuel system for said engine comprising fuel supply passage means, valve means operatively connected to said passage means for controlling fuel through said passage means, fuel by-pass valve means operatively connected to said passage means and responsive to the speed of one of said air compressors for controlling the fuel pressure differential across said first named valve means as a function of the sensed speed, means for controlling the operation of said first named valve means including speed responsive means connected to said compressors, and means operatively connected to said speed responsive means and to said first named valve means to cause the latter to assume a fuel flow position dependent upon the ratio of the speeds sensed to thereby limit fuel flow to the engine in accordance with a predetermined maximum allowable fuel flow schedule.

3. In a fuel system for a gas turbine engine having a burner, a low pressure compressor, a high pressure compressor, a conduit for supplying fuel to the burner, valve means in the conduit for controlling the fuel flow therethrough, means for actuating said valve means comprising means responsive to the speed of said low pressure compressor, means responsive to the speed of said high pressure compressor, valvular means in said conduit operatively connected to said high pressure compressor speed responsive means for controlling the pressure head across said valve means as a function of the speed of said high pressure compressor, pressure responsive means responsive to the pressure head across said valve means, and means operatively connected to said low pressure compressor speed responsive means, said pressure responsive means and said valve means for controlling the operation of said valve means as a function of the ratio of said low and high pressure compressor speeds.

4. In a fuel system for a gas turbine engine having a burner and first and second air compressors, the combination of a conduit for delivering fuel to said burner, first valve means in the conduit for controlling fuel flow therethrough, second valve means operatively connected to said conduit for controlling the pressure drop across said first valve means, means responsive to the speed of said first air compressor operatively connected to said second valve means for controlling the operation of said second valve means and thus the pressure drop across said first valve means as a function of the speed of said first air compressor, a pressure responsive member responsive to the pressure drop across said first valve means, means responsive to the speed of said second air compressor, linkage mechanism operatively connecting said first and second air compressor speed responsive means with said first valve means for controlling the position of said first valve means as a function of the ratio of said first and second air compressor speeds, said linkage mechanism including an axially and rotatably movable cam member movable in one of said directions as a function of the pressure differential across said pressure responsive member and in the other of said directions as a function of the speed of said second air compressor.

5. In a fuel system for a gas turbine engine having a burner and independently driven low pressure and high pressure air compressors, the combination of a conduit for supplying pressurized fuel to said burner, valve means in the conduit for controlling the fuel flow therethrough, means for controlling the pressure head across said valve means as a function of the speed of one of said air compressors, means operatively connected to said valve means for controlling the operation of said valve means including means responsive to the speed of the other of said air compressors, means responsive to the pressure differential across said valve means, means responsive to a fluid pressure generated by said high pressure compressor, and means for controlling said fluid pressure as a function of the ratio of pressures across said low and high pressure compressors, whereby fuel flow to the burner is controlled according to the relationship $$W_f = KNP_D f_1\left(\frac{P_D}{P_i}\right) f_2\left(\frac{N_1}{N_2}\right)$$

wherein $W_f$ denotes metered fuel flow to the burner, K is a constant, N represents the speed of either compressor, $P_D$ represents high pressure compressor discharge pressure, $P_i$ represents low pressure compressor inlet pressure, $N_1$ and $N_2$ denote low and high pressure compressor speeds, respectively, and $f_1$ and $f_2$ represent predetermined functions.

6. In a fuel control system for a gas turbine engine having a burner, a low pressure air compressor, a high pressure air compressor, a conduit for supplying fuel to the burner, valve means in the conduit for controlling the flow of fuel to said burner, means operatively connected to said valve means for controlling the position of said valve means in said conduit comprising first means responsive to the speed of said low pressure air compressor, second means responsive to the speed of said high pressure air compressor and operative to control the pressure drop across said valve means as a function of high pressure compressor speed, and third means operatively connected to said first and second means and said valve means for controlling the position of said valve means as a function of the ratio of said low pressure compressor speed to said high pressure compressor speed, said third means including a member actuated by said first means, a first lever pivotally secured to said member and arranged to control the position of a servo valve, a servomotor operative in response to a servo pressure controlled by said servo valve, a chamber, a pressure responsive member in said chamber, a first fluid connection between said chamber and the upstream side of said valve means, a second fluid connection between said chamber and the downstream side of said valve means, said pressure responsive member being responsive to the fluid pressure differential between said first and second fluid connections, a three dimensional cam operatively connected to said pressure responsive member and to said servomotor and being axially and rotatably actuable in response to movement of said pressure responsive member and said servomotor, respectively, a follower member engageable with the working surface of said cam, a second lever having one end pivotally secured to said follower member and being adapted to rotate about a fixed point at the opposite end, and a valve member operatively connected to said second lever and actuated by the lever, said valve member acting to control a servo pressure to which said valve means is responsive.

7. The combination with a gas turbine engine equipped with two independently driven air compressors having a characteristic range of instability, of a fuel system for said engine comprising a fuel conduit connected to supply fuel to the engine, rotatably and axially movable valve means operatively connected to said fuel conduit for controlling fuel flow therethrough, fuel by-pass valve means operatively connected to said fuel conduit for controlling the fuel pressure differential across said valve means, control means for said first named valve means including first speed responsive means operatively connected to one of said air compressors, second speed responsive means operatively connected to the other of said air compressors for controlling the operation of said fuel by-pass valve means and thus said fuel pressure differential as a function of the speed of said other compressor, pressure responsive means responsive to said fuel pressure differential, rotatably and axially movable cam means operatively connected to said first speed responsive means, said pressure responsive means and to said valve means for controlling the axial position of said first named valve means to thereby limit the maximum flow position thereof as a function of the ratio of the sensed compressor speeds to avoid said characteristic range of instability said cam means being actuated rotatably as a function of one compressor speed and axially as a function of the other compressor speed, and means responsive to the discharge pressure of one of said compressors operatively connected to said first named valve means for controlling the rotative position of said first named valve means as a function of said discharge pressure.

8. In a fuel system for a gas turbine engine having a burner, a low pressure compressor, a high pressure compressor, a conduit for supplying fuel to the burner, valve means in the conduit for varying the flow to the burner, first means responsive to the speed of one of said compressors for controlling a fuel pressure differential across said valve means, second means responsive to the speed of the other of said compressors, third means responsive to the pressure differential across said valve means, fourth means operatively connecting said valve means with said second and third means for controlling the position of said valve means as a function of the ratio between said low and high pressure compressor speeds, said fourth means being actuable as a function of the ratio of said low and high pressure compressor speeds to vary the maximum flow position of said valve means to avoid compressor instability during an acceleration of the engine, and fifth means operatively connected to said second means and said valve means for overriding said fourth means at a predetermined speed of the other of said compressors.

9. In a fuel system for a gas turbine engine having a burner, a low pressure compressor, a high pressure compressor and a control lever for controlling the operation of the engine, the combination of a fuel conduit for supplying fuel to the burner, valve means in the conduit for varying the fuel flow to the burner, first means responsive to the speed of one of said compressors for controlling a fuel pressure differential across said valve means, second means responsive to the speed of the other of said compressors, third means responsive to the pressure differential across said valve means, fourth means operatively connecting said valve means with said second and third means for controlling the position of said valve means as a function of the ratio between said low and high pressure compressor speeds, said fourth means being actuable as a function of the ratio of said low and high pressure compressor speeds to vary the maximum flow position of said valve means to avoid compressor instability during an acceleration of the engine, and governor means operatively connected to said second means, said control lever and said valve means for overriding said fourth means at a predetermined speed of the other of said compressors, said predetermined speed corresponding to the position of said control lever.

10. In a fuel control system for a gas turbine engine having a burner, a low pressure air compressor, a high pressure air compressor, a conduit for supplying fuel to the burner, valve means in the conduit for controlling the flow of fuel to the burner, said engine having a characteristic range of unstable operation, means operatively connected to said valve means for controlling the position of said valve means in said conduit comprising first means responsive to the speed of said low pressure air compressor, second means responsive to the speed of said high pressure compressor including fuel by-pass valve means operatively connected to said fuel conduit for controlling the fuel pressure differential across said first named valve means as a function of high pressure compressor speed, third means operatively connected to said first means, said first named valve means and responsive to the fuel pressure differential across said first named valve means for controlling the position of said first named valve means as a function of the ratio of said low pressure compressor speed to said high pressure compressor speed throughout said characteristic range of unstable operation and fourth means operatively connected to said first named valve means and said first means, said fourth means being operative to override said third means at a predetermined speed of said low pressure.

References Cited in the file of this patent

UNITED STATES PATENTS

| | | |
|---|---|---|
| 2,754,658 | Farkas | July 17, 1956 |
| 2,785,848 | Lombard et al. | Mar. 19, 1957 |
| 2,848,870 | Eastman | Aug. 26, 1958 |
| 2,856,754 | Torell | Oct. 21, 1958 |
| 2,874,540 | Esmeier et al. | Feb. 24, 1959 |
| 2,918,790 | Schoch | Dec. 29, 1959 |
| 2,923,128 | Fortmann | Feb. 2, 1960 |
| 2,939,280 | Farkas | June 7, 1960 |

FOREIGN PATENTS

| | | |
|---|---|---|
| 204,244 | Australia | Nov. 14, 1956 |